United States Patent Office 2,719,076
Patented Sept. 27, 1955

2,719,076
PRODUCTION OF SODIUM SULFIDE

Gerhard Koudela and Karl Wintersberger, Ludwigshafen (Rhine), Germany, assignors to Badische Anilin- & Soda-Fabrik Aktiengesellschaft, Ludwigshafen (Rhine), Rheinland-Pfalz, Germany No Drawing. Application July 20, 1953,
Serial No. 369,254

Claims priority, application Germany July 22, 1952

3 Claims. (Cl. 23—137)

This invention relates to improvements in the production of sodium sulfide by reduction of sodium sulfate with reducing gases in a turbulent layer.

Highly concentrated sodium sulfide can be prepared according to the turbulent layer process by reduction of anhydrous sodium sulfate with reducing gases, in particular hydrogen or gases containing hydrogen. For this purpose it is advantageous to use a shaft furnace in the reaction zone of which the sodium sulfate particles, of which the grain size may amount for example to 0.1 to 5 mm., are kept in a constant up-and-down turbulent motion by the reducing gases. The preheating of the sodium sulfate and the cooling of the reaction product are advantageously also carried out in a turbulent layer. In order that the process should be carried out satisfactorily it is necessary to keep the temperature in the reaction zone within a distinct range, because the difference between the optimum reaction temperature and the temperature at which sintering of the reacting mass begins, amounts to only a few degrees. Whereas sodium sulfate melts at about 880° C. and sodium sulfide not until about 1180° C., the melting point of sulfate-sulfide mixtures is considerably lower and is, indeed, at about 620° to 750° C. Care must therefore be taken while carrying out the reduction process that by a sufficient formation of sulfide the melting point of the sulfide-sulfate mixture is always higher than the reaction temperature prevailing in the turbulent layer. The formation of sodium sulfide from anhydrous sodium sulfate by reduction with reducing gases is not a process which proceeds rapidly, but an endothermic prolonged reaction, the technically useful speed of which depends on the nature of the reducing gas (as for example methane, carbon monoxide, mixtures of carbon monoxide and hydrogen, or hydrogen), on the nature of the added catalyst and on the height of the reaction temperature. A furnace charge of sodium sulfate must therefore be increasingly reduced, i. e. the reduction is commenced at about 650° C. and the temperature is gradually increased at the rate at which the melting point of the reaction mixture rises in the course of the process, up to about 750° C., in order to obtain a uniform high-percentage sodium sulfide which is then cooled, for example in another turbulent layer then removed.

We have now found that the turbulent layer process for the formation of sodium sulfide from sodium sulfate can be carried out advantageously, not by charging the furnace batchwise with fresh sodium sulfate and increasing the reduction with temperature, but by supplying the sodium sulfate to be reacted to a turbulent layer consisting of concentrated sodium sulfide in such an amount that the concentration of the sodium sulfate in the turbulent layer remains less than 10%, preferably less than 5%. An amount of sulfide is removed from the furnace corresponding to the amount of sulfate added. A considerable advantage of working in this way resides in the fact that the reaction temperature in the reduction zone can be kept constant at an optimum value because the individual particles of sulfate or sulfide-sulfate moving between the particles of sodium sulfide have such a low probability of contact with each other that the formation of agglomerates followed by disturbance in the turbulent layer can hardly occur. The turbulent layer is kept at a constant temperature depending on the nature of the added catalyst, within a range of 675° to 750° C. If by reason of too high a furnace temperature caused by inaccurate control of the operation, small agglomerations do occur, for example at the wall of the furnace or at the bottom of the turbulent layer, these are removed and broken up by the large mass of freely moving sulfide particles without causing any great disturbance in operation.

The following example will further illustrate this invention but the invention is not restricted to this example.

Example 500 kilograms of sodium sulfide having a grain size of 0.5 to 3 millimetres is kept, by a hot mixture of nitrogen and hydrogen, in a constant up-and-down turbulent motion at 750° C. above a grate in a shaft furnace the cross-section of which is 1 square metre. 40 kilograms of sodium sulfate having a grain size of 0.5 to 3 millimetres and containing 1% of sodium oxalate as catalyst are introduced into the said turbulent layer per hour by means of a metering device. During the same time interval 22 kilograms of 94 to 96% sodium sulfide are continually withdrawn from the furnace.

We claim:

1. A process for the production of sodium sulfide by reduction of sodium sulfate with hydrogen by the turbulent fluid layer method which comprises introducing the sodium sulfate to be reacted into a turbulent fluid layer consisting predominantly of sodium sulfide at such a rate that the concentration of the sodium sulfate present in said turbulent fluid layer amounts to at most 10 per cent by weight and keeping said layer at a constant temperature within the range of 675° to 750° C.

2. A process for the production of sodium sulfide by reduction of sodium sulfate with hydrogen by the turbulent fluid layer method which comprises introducing the sodium sulfate to be reacted into a turbulent fluid layer consisting predominantly of sodium sulfide at such a rate that the concentration of the sodium sulfate present in said turbulent fluid layer amounts to at most 5 per cent by weight and keeping said layer at a constant temperature within the range of 675° to 750° C.

3. A process for the production of sodium sulfide by reduction of sodium sulfate with hydrogen by the turbulent fluid layer method which comprises introducing the sodium sulfate to be reacted into a turbulent fluid layer consisting predominantly of sodium sulfide at such a rate that the concentration of the sodium sulfate present in said turbulent fluid layer amounts to at most 10 per cent by weight, keeping said layer at a constant temperature within the range of 675° to 750° C. and removing from said layer an amount of sodium sulfide corresponding to the amount of sodium sulfate introduced into said layer.

References Cited in the file of this patent

UNITED STATES PATENTS

| 1,916,803 | Ley et al. | July 4, 1933 |
| 2,675,295 | Daniels | Apr. 13, 1954 |

FOREIGN PATENTS

| 643,398 | Germany | Apr. 6, 1937 |

OTHER REFERENCES

White et al., "Manufacture of Sodium Sulfide," Ind. and Eng. Chem., Feb. 1936, pages 244–246.